(12) United States Patent
Jeon

(10) Patent No.: US 6,782,187 B1
(45) Date of Patent: Aug. 24, 2004

(54) TIME-LAPSE RECORDING/REPRODUCING SYSTEM AND METHOD FOR RECORDING/ REPRODUCING AUDIO SIGNAL

(75) Inventor: Jin-kyu Jeon, Suwon (KR)

(73) Assignee: Samsung Electronics Company, Ltd., Kyungki-do (KR)

( * ) Notice: Subject to any disclaimer, the term of this patent is extended or adjusted under 35 U.S.C. 154(b) by 901 days.

(21) Appl. No.: 09/586,751

(22) Filed: Jun. 5, 2000

(30) Foreign Application Priority Data

Jun. 5, 1999 (KR) ........................................ 1999-20818

(51) Int. Cl.$^7$ ................................................ H04N 5/76
(52) U.S. Cl. ........................................ 386/46; 386/96
(58) Field of Search ............................... 386/1, 39, 46, 386/96, 97–104; 360/8, 5, 18, 20; 348/143; H04N 5/76, 9/79, 5/781, 7/18, 9/47

(56) References Cited

U.S. PATENT DOCUMENTS 4,819,097 A * 4/1989 Azuma et al. .............. 386/101
5,319,501 A * 6/1994 Mitsuhashi ................. 386/101
5,680,499 A * 10/1997 Choi ............................ 386/68
5,757,565 A * 5/1998 Park et al. .................... 360/32
6,151,440 A * 11/2000 Inschlag ....................... 386/78

* cited by examiner

Primary Examiner—Thai Tran
(74) Attorney, Agent, or Firm—Sughrue Mion, PLLC

(57) ABSTRACT

Time-lapse recording/reproducing system and method for recording/reproducing audio signals are provided. The method, in the time-lapse recording/reproducing system for intermittently recording and reproducing predetermined units of a video signal, includes time-compressing an audio signal corresponding to the predetermined unit of a video signal presently recorded and all other corresponding audio signals generated before the predetermined unit of a video signal to be next recorded, to record the time-compressed audio signals between the predetermined units of a video signal. The method further includes sequentially outputting time compressed audio signals corresponding to the predetermined unit of the video signal while reproducing the predetermined unit of the video signal as a still image. Accordingly, an audio signal corresponding to a video signal can be recorded and reproduced without loss in a time-lapse recording/reproducing system.

9 Claims, 6 Drawing Sheets

FIG. 4
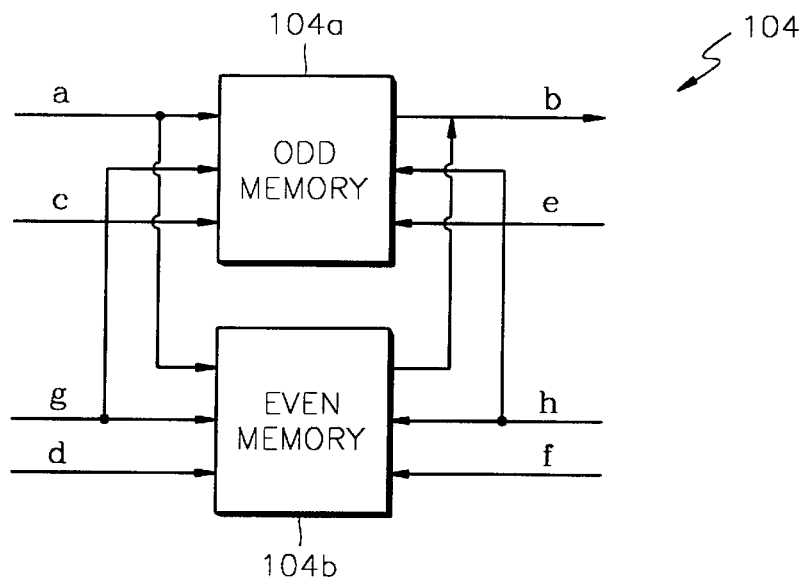
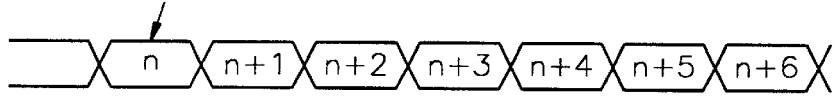
FIG. 5A
FIG. 5B
FIG. 5C
FIG. 5D
FIG. 5E
FIG. 5F

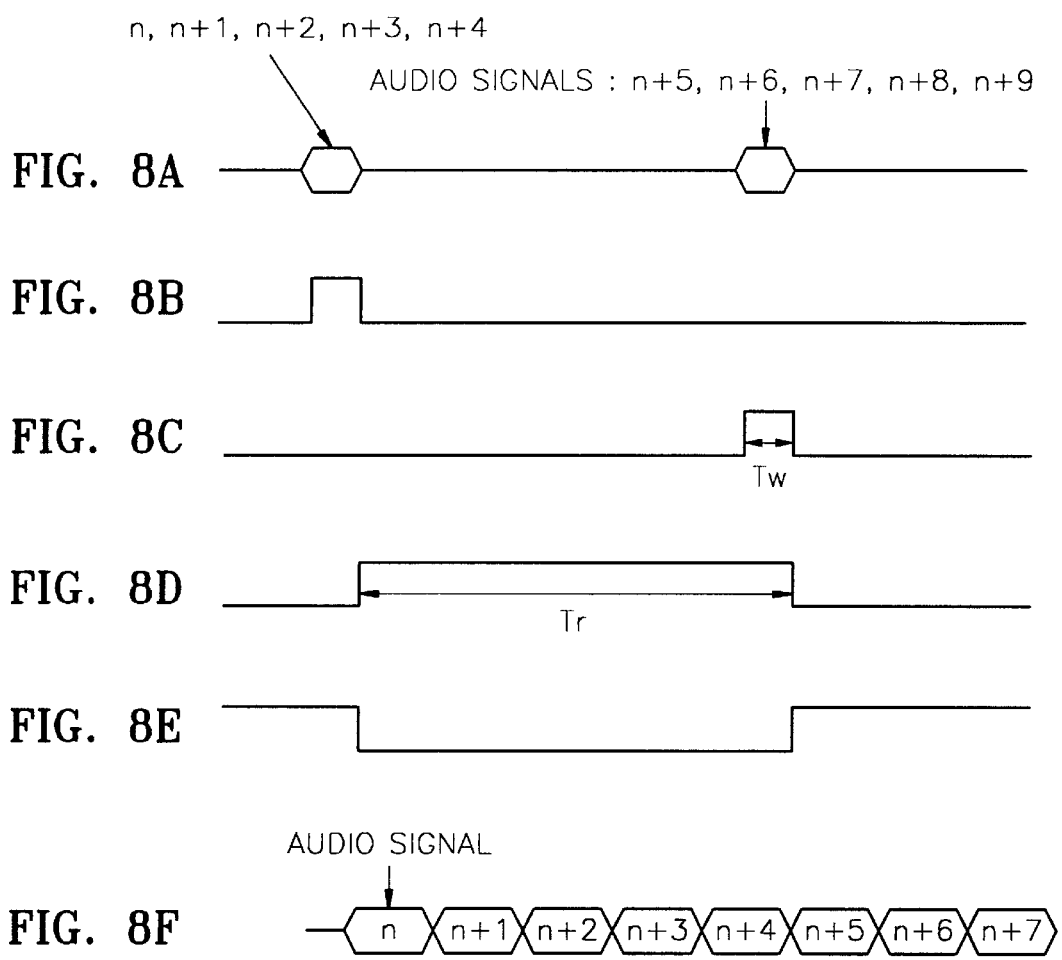

TIME-LAPSE RECORDING/REPRODUCING SYSTEM AND METHOD FOR RECORDING/REPRODUCING AUDIO SIGNAL

BACKGROUND OF THE INVENTION

1. Field of the Invention

The present invention relates to an audio signal recording/reproducing system, and more particularly, to time-lapse recording/reproducing system and method for recording/reproducing audio signals.

2. Description of the Related Art

A typical example of a conventional time-lapse recording/reproducing system is a time-lapse video tape recorder (VTR) which intermittently shifts a magnetic tape to record a video field or frame. Thus, the time-lapse VTR is mainly used as a monitoring device for recording video signals for long periods of time. However, the conventional of VTR can record only video signals because each of the fields or frames is independent, so that the video signals can be normally reproduced although they are recorded intermittently. On the other hand, audio signals are difficult to reproduce normally since there is no continuity in an intermittent recording. Accordingly, it is desirable to a time-lapse VTR which is capable of normally reproducing audio signals as well as video signals.

SUMMARY OF THE INVENTION

To solve the above problem, it is an object of the present invention to provide time-lapse recording/reproducing system and method for processing audio signals so that the audio signals corresponding to video signals can be reproduced normally.

It is another object of the present invention to provide time-lapse recording/reproducing system and method for recording/reproducing audio signals corresponding to a predetermined unit of a video signal in a time-compressed manner.

To achieve the above objects, the present invention provides a time-lapse recording/reproducing method within, a time-lapse recording/reproducing system which preferably includes the steps of time-compressing an audio signal corresponding to the predetermined unit of a video signal presently recorded and all other corresponding audio signals generated before the predetermined unit of a video signal to be next recorded, to record the time-compressed audio signals between the predetermined units of a video signal, and sequentially outputting time compressed audio signals corresponding to the predetermined unit of the video signal while reproducing the predetermined unit of the video signal as a still image.

To achieve the above objects, the present invention also provides a time-lapse recording system for intermittently recording predetermined units of a video signal, which preferably includes a buffer memory for time-compressing an audio signal corresponding to the predetermined unit of a video signal presently recorded and all other corresponding audio signals generated before the predetermined unit of a video signal to be next recorded, a multiplexer for performing multiplexing so that the time-compressed audio signals can be transmitted after the predetermined units of video signal corresponding to the time-compressed audio signals are sequentially transmitted, a recording amplifier for sequentially transmitting at least one predetermined unit of the video signal among the predetermined units of the video signal corresponding to the time-compressed audio signals transmitted by the multiplexer, and the time-compressed audio signals, a recording unit for recording the time-compressed audio signals between the predetermined units of the video signal which is intermittently transmitted by the recording amplifier, and a system controlling unit for controlling the functions of the buffer memory, multiplexer, recording amplifier, and recording unit.

Furthermore, the present invention provides a time-lapse reproducing system for intermittently recording a predetermined unit of a video signal and reproducing the video signals and the audio signals from a medium on which time-compressed audio signals corresponding to a previously recorded video signal of the predetermined unit are continuously recorded between the recorded video signals of the predetermined unit. The system preferably includes a demultiplexer for separating and outputting the predetermined unit of the video signal and the corresponding time-compressed audio signals, when a signal reproduced from the medium is applied, a buffer memory for storing the time-compressed audio signals output from the demultiplexer to output the time-compressed audio signals in real time while outputting the corresponding predetermined unit of the video signal, and a system controlling unit for controlling the operations of the demulitplexer and buffer memory.

BRIEF DESCRIPTION OF THE DRAWINGS

The above objective and advantage of the present invention will become more apparent by describing in detail a preferred embodiment thereof with reference to the attached drawings in which:

FIG. 4 shows a preferred embodiment of the buffer memory shown in FIG. 1;

FIGS. 5A–5F are timing diagrams which show the operation of the buffer memory of FIG. 4;

FIGS. 8A–8F are timing diagrams which show the operation of the buffer memory of FIG. 6.

DESCRIPTION OF THE PREFERRED EMBODIMENTS

Figure 1:
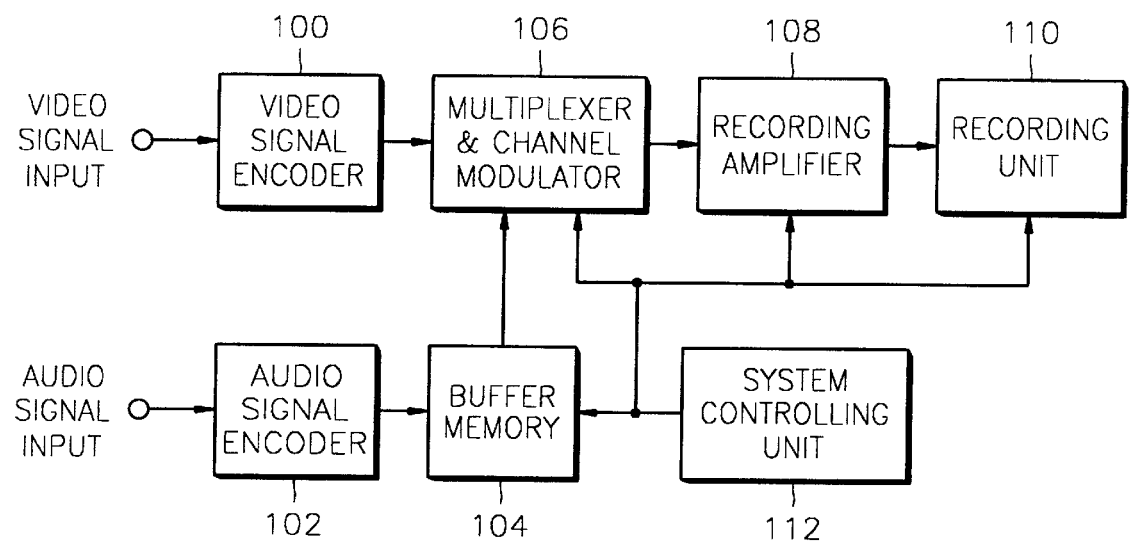
FIG. 1 is a block diagram showing the function of a time-lapse recording system which can record audio signals according to the present invention.

Referring to FIG. 1, which is a block diagram showing the function of a time-lapse recording/reproducing system for recording audio signals according to the present invention, the time-lapse recording system includes a video signal encoder 100, an audio signal encoder 102, a buffer memory 104, a multiplexer & channel modulator 106, a recording amplifier 108, a recording unit 110 and a system controlling unit 112.

The video signal encoder 100 encodes an input video signal while the audio signal encoder 102 encodes an input audio signal. The buffer memory 104 stores and time-compresses audio signals output from the audio signal encoder 102. The multiplexer & channel modulator 106 selects predetermined units of a video signal, that is a video field or video frame, output from the video signal encoder 100 and the time-compressed audio signals output from the buffer memory 104 according to a control signal generated by the system controlling unit 112, and modulates the selected video fields or video frames and time-compressed audio signals into a signal suitable for recording. The recording amplifier 108 amplifies the video fields or video frames and the time-compressed audio signals output from the multiplexer & channel modulator 106, according to a control signal from the system controlling unit 112. The recording unit 110, which includes a recording medium and a conveyor thereof, records the video fields or video frames and the time-compressed audio signals output from the recording amplifier 108.

The system controlling unit 112 controls the time-lapse recording system shown in FIG. 1 so that the encoded video field or frame can be intermittently recorded on a recording medium and the time-compressed audio signals corresponding to the recorded video field or frame can be recorded on the recording medium. More specifically, the system controlling unit 112 controls the time-lapse recording system so that the system may detect the encoded video field or frame whenever a predetermined number of vertical synchronization intervals elapses or at every predetermined detection cycle to record the detected video field or frame on a recording medium. Then, the system controlling unit 112 controls the system in order to time-compress audio signals corresponding to the recorded video field or frame and to record them on the recording medium. In particular, the system controlling unit 112 controls the readout mode of the buffer memory 104 for time-compressing the audio signals, and controls the recording amplifier 108 in order to amplify only the detected video field or frame and the corresponding time-compressed audio signals.

Figure 2:
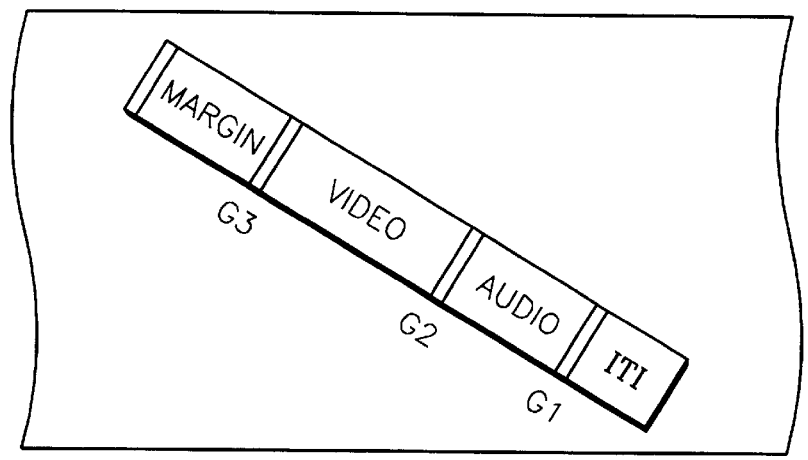
FIG. 2 shows the track pattern of a digital video tape recorder (VTR)

In the track pattern of a digital VTR shown in FIG. 2, an insert and track information (ITI) area, an audio signal area (AUDIO), and an effective data area (VIDEO) for recording video signal and subcode, are allotted. Further, in order to completely erase previously effective data if there is an overlap in recording, a, margin area (MARGIN) is allotted at the end of the track in accordance with the height and position of the track pattern. In the ITI area, a reference signal such as a clock signal is recorded in order to record subcodes of audio and video signals, and if the audio and video signals are recorded, their position information is then recorded thereon. Gaps G1–G3 are included between each of the areas to prevent misalignment of a signal recorded thereon.

Figure 3A:
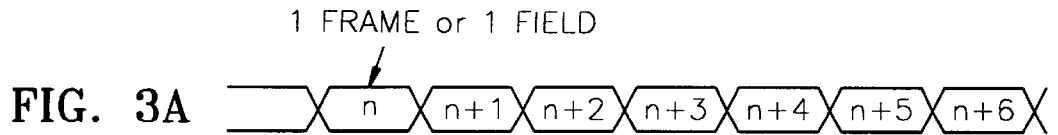
FIGS. 3A–3H are timing diagrams which show the operation of the time-lapse recording system of FIG. 1.
Figure 3B:
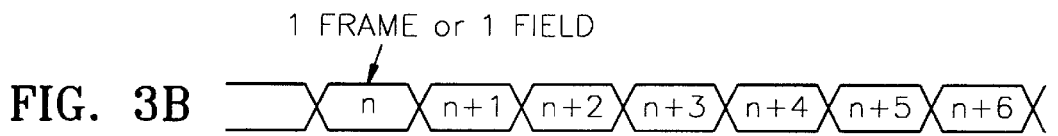
Figure 3C:
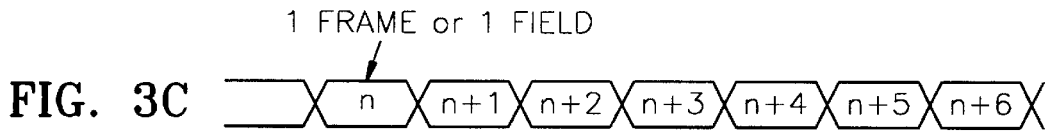
Figure 3D:
Figure 3E:
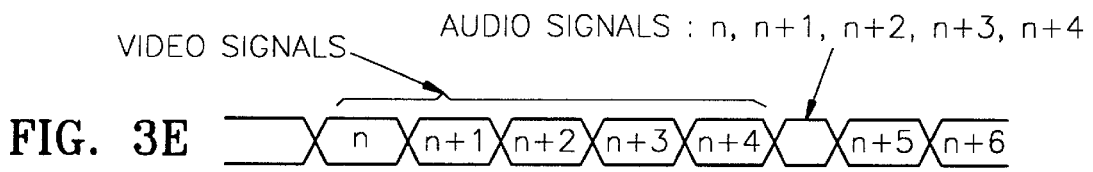
Figure 3F:
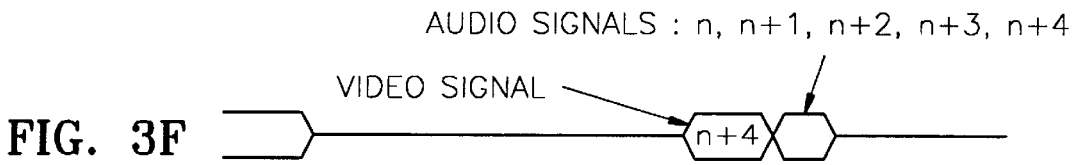
Figure 3G:
Figure 3H:
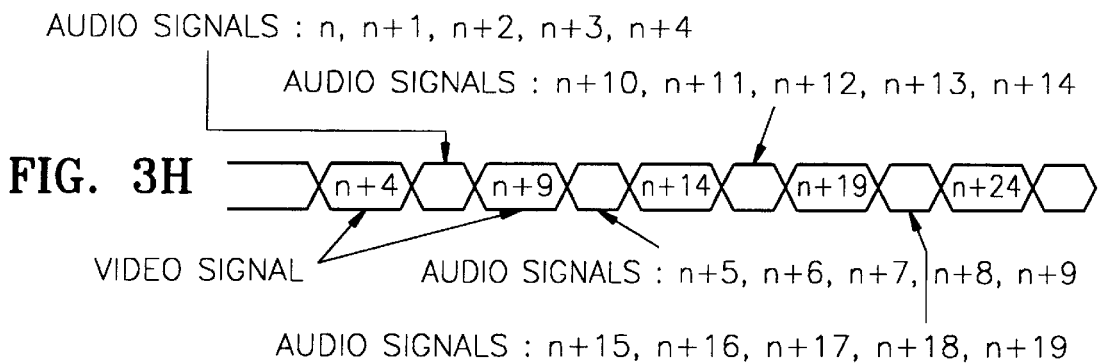

FIGS. 3A–3H are timing diagrams of the operation of the time-lapse recording system shown in FIG. 1. FIG. 3A shows video signals which are input in a predetermined unit, i.e., field or frame. FIG. 3B shows audio signals synchronized with the video signals which are applied with a cycle such as that shown in FIG. 3A. FIG. 3C shows audio signals input to the buffer memory 104 while FIG. 3D shows audio signals output from the buffer memory 104. FIG. 3E is the output signal of the multiplexer & channel modulator 106. FIG. 3F is the output signal of the recording amplifier 108. FIG. 3G is the system control signal generated by the system controlling unit 112. FIG. 3H is the recording pattern of a recording medium according to the operations shown in FIGS. 3A–3G.

Referring to FIGS. 2 and 3, the operation of the time-lapse recording system shown in FIG. 1 will now be described. At the outset, in order to record all audio signals while intermittently recording a video field or frame, the time-lapse recording system actively controls the readout and record time of the buffer memory 104 according to the detection cycle of the video field or frame to produce the time-compressed audio signal. Then, the multiplexer & channel modulator 106 matches the encoded video fields or frames and the time-compressed audio signals. The recording amplifier 108 amplifies the video field or frame detected according to the detection cycle and the corresponding time-compressed audio signals. The recording unit 110 records the video field or frame and the time-compressed audio signals output from the recording amplifier 108 on a recording medium.

The operation of the time-lapse recording system, in which one video field or frame per five video fields or frames is recorded as shown in FIGS. 3A–3H, will now be described. When video and audio signals are input as shown in FIGS. 3A and 3B, the audio signals are recorded in the buffer memory 104 as shown FIG. 3C according to a record enable signal generated by the system controlling unit 112 shown in FIG. 1, and are read out from the buffer memory 104 as shown in FIG. 3D according to a readout enable signal generated by the system controlling unit 112.

The buffer memory 104 includes an odd memory 104a and an even memory 104b as shown in FIG. 4. The data input and output lines of the odd and even memories 104a and 104b are denoted by a and b in FIG. 4. The record enable signal lines of the odd and even buffer memories 104a and 104b are denoted by c and d while the readout enable signal lines thereof are denoted by e and f. The record and readout clock signal lines thereof are denoted by g and h.

The thus structured buffer memory 104 operates the manner as shown in FIG. 5 to output the time-compressed audio signal. More specifically, FIG. 5A shows data input to the buffer memory 104. FIGS. 5B and 5C show the record enable signals of the odd and even memories 104a and 104b. FIGS. 5D and 5E each show the readout enable signals of the odd and even memories 104a and 104b FIG. 5F shows the time-compressed audio signal output from the buffer memory 104. Therein, the pulse width of the record enable signal is denoted by Tw, and the pulse width of the readout enable signal is denoted by Tr.

It can be observed from the timing diagrams shown in FIGS. 5A–5F that the even memory 104b outputs the audio signal (n−5, n−4, n−3, n−2, n−1) corresponding to five video fields or frames as the time-compressed audio signals through the output line b on the rising edge of the readout enable signal shown in FIG. 5E. In this case, the odd memory 104a sequentially stores audio signals which are applied through input line a, on the rising edge of the record enable signal applied as shown in FIG. 5B. Then, the odd memory 104a outputs the stored audio signals (n, n+1, n+2, n+3, n+4) as the time-compressed audio signals through the output line b, on the rising edge of the readout enable signal which is applied through the readout enable signal line e as shown in FIG. 5D.

The multiplexer & channel modulator 106 multiplexes the video fields or frames output from the video signal encoder 100 and the time-compressed audio signals output from the buffer memory 104 as shown in FIG. 3D to output them as shown in FIG. 3E. In other words, the multiplexer & channel modulator 106 outputs the five video frames or fields and the corresponding time-compressed audio signals in a sequence. The video fields or frames and time-compressed audio signals output from the multiplexer & channel modulator 106 are transmitted to the recording amplifier 108. In response to a control signal from the system controlling unit 112 as shown in FIG. 3G, the recording amplifier 108 amplifies only the fifth video frame or field and the time-compressed audio signals corresponding to five video frames or fields, as shown in FIG. 3F. The recording unit 110 records the video frames or fields and time-compressed audio signals on the recording medium accordingly, as shown in FIG. 3H.

The aforementioned time-lapse recording/reproducing system can be realized to control the readout mode of the buffer memory 104 according to its capacity. This means that when the capacity of the buffer memory 104 is set as an arbitrary value and then stored data reaches the arbitrary value, the stored data is transmitted to the multiplexer & channel modulator 106 within the compressed time so that it can be multiplexed with video fields or frames. Additionally, if only an audio signal is to be recorded, the time-lapse recording/reproducing system may record only audio signals on the entire recording area of a recording medium.

Figure 6:
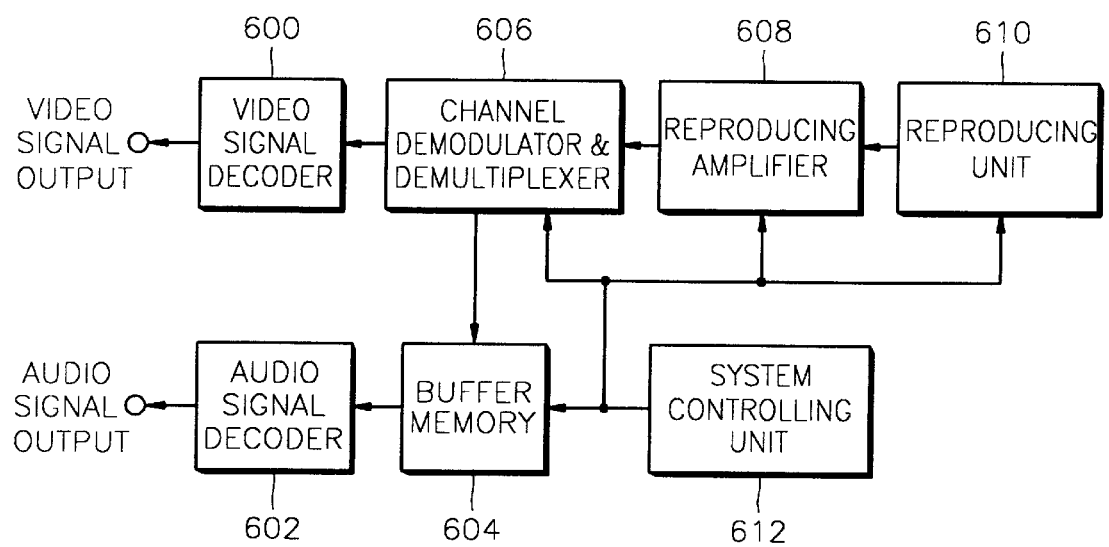
FIG. 6 is a block diagram showing the function of a time-lapse reproducing system which can reproduce audio signals according to the present invention.

Referring to FIG. 6, which is a block diagram showing the function of a time-lapse reproducing system which can reproduce audio signals according to the present invention, the time-lapse, reproducing system includes a reproducing unit 610, a reproducing amplifier 608, a channel demodulator & demultiplexer 606, a buffer memory 604, an audio signal decoder 602, a video signal decoder 600, and a system controlling unit 612.

The reproducing unit 610 reproduces a signal recorded on a recording medium, and the reproducing amplifier 608 then amplifies the signal output from the reproducing unit 610. The channel demodulator & demultiplexer 606 channel demodulates the signal output from the reproducing amplifier 608 to classify it into data corresponding to a video signal and data corresponding to an audio signal. The video and audio signal are output to the video signal decoder 600 and the buffer memory 604, respectively. The buffer memory 604, which has the structure shown in FIG. 4, stores the audio signals output from the channel demodulator & demultiplexer 606. The audio signal decoder 602 decodes the audio signal output from the buffer memory 604 to recover it to the original audio signal. The video signal decoder 600 decodes the video signals output from the channel demodulator & demultiplexer 606 to recover the original video signal therefrom. The system controlling unit 612 generates a system control signal to output the audio signal corresponding to a detected video field or frame while reproducing the detected video field or frame, and to maintain the detected video field or frame as a still image while outputting all corresponding audio signals, except the output audio signal, that are generated before the next detected video field or frame is reproduced.

Figure 7A:
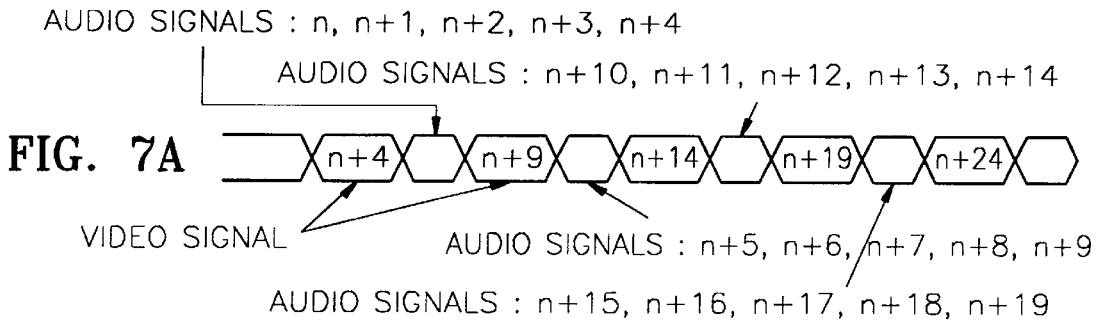
FIGS. 7A–7E are timing diagrams showing the operation of the time-lapse reproducing system of FIG. 6.
Figure 7B:
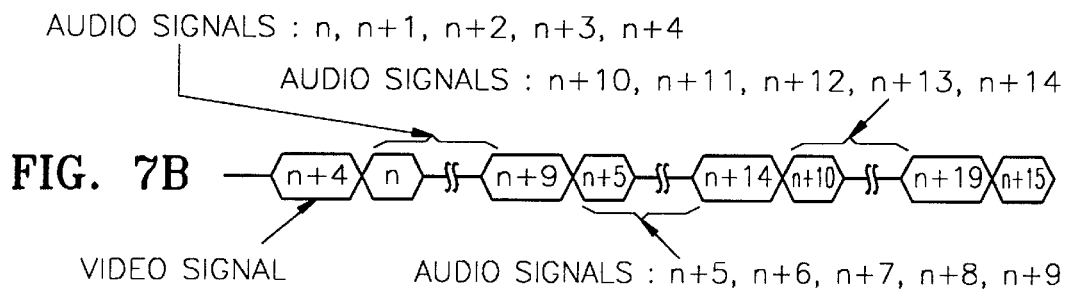
Figure 7C:
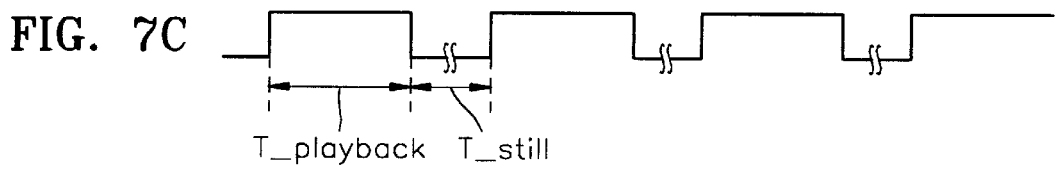
Figure 7D:
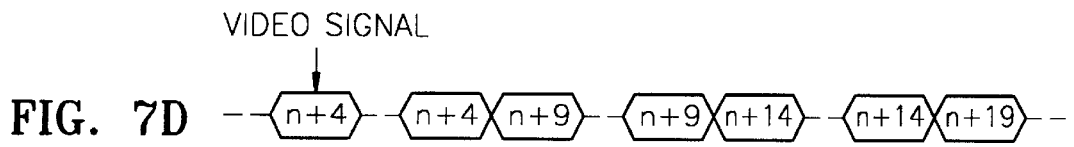
Figure 7E:
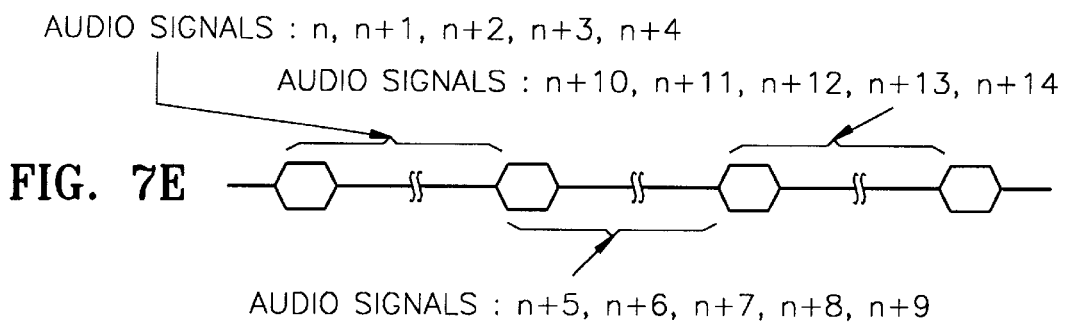

FIGS. 7A–7E are timing diagrams showing the operation of the time-lapse reproducing system shown in FIG. 6. FIG. 7A shows video fields or frames and audio signals output from the reproducing unit 610, and FIG. 7B shows the output signal of the reproducing amplifier 608. FIG. 7C shows a system control signal output from the system controlling unit 612 which controls an interval T_playback, at which a video signal is reproduced, and an interval T_still at which a still picture is maintained. FIGS. 7D and 7E show the video fields or frames and audio signals, respectively, output from the channel demodulator & demultiplexer 606.

FIGS. 8A–8F are timing diagrams showing the operation of the buffer memory 604 shown in FIG. 6. FIG. 8A shows time-compressed audio signals transmitted from the channel demodulator & demultiplexer 606 to the buffer memory 604. FIGS. 8B and 8C show record enable signals for storing the time-compressed audio signals in the odd and even memories 104a and 104b, respectively. FIGS. 8D and 8E show readout enable signals for reading out the time-compressed audio signals stored in the odd and even memories 104a and 104b. FIG. 8F shows the audio signal output from the buffer memory 604.

Referring to FIGS. 7 and 8, the operation of the time-lapse reproducing system shown in FIG. 6 will now be described. In order to reproduce the recorded video and audio signals as shown in FIG. 7A, the time-lapse reproducing system performs a reproducing operation in such a way as to recover the recorded video and audio signal in real time. In other words, the video field or frame and audio signal are decoded and output, respectively, at the first pulse interval or reproducing interval T-playback of a control signal output from the system controlling unit 612 as shown in FIG. 7C, while the video field or frame is maintained in a still state and all corresponding audio signals, except the output audio signal, are sequentially output at the second pulse interval or the still interval T-still. The video and audio signals output from the channel demodulator & demultiplexer 606, are therefore demultiplexed as shown in FIGS. 7D and 7E, and transmitted to the video and audio signal decoders 600 and 602, respectively, so that they are reproduced as the original signals.

In this case, the buffer memory 604 stores the time-compressed audio signals (n, n+1, n+2, n+3, n+4) in the odd memory 104a in response to a record enable signal generated by the system controlling unit 612 as shown in FIG. 8B, and sequentially outputs the audio signals stored in the odd memory 104a in real time in response to a readout enable signal generated by the system controlling unit 612 as shown in FIG. 8D. Further, the buffer memory 604 stores the time-compressed audio signals (n+5, n+6, n+7, n+8, n+9) in the even memory 104b in response to a record enable signal generated by the system controlling unit 612 as shown in FIG. 8C, and sequentially outputs the audio signals stored in the even memory 104b in real time in response to a readout enable signal generated by the system controlling unit 612 as shown in FIG. 8E.

As described in the foregoing, according to the present invention, audio signals corresponding to a video field or frame can be recorded and reproduced without loss in a time-lapse recording and or reproducing system.

What is claimed is:

1. A time-lapse recording and reproducing method for intermittently recording and reproducing a plurality of predetermined units of a video signal, the method comprising the steps of:

(a) time-compressing a plurality of audio signals corresponding to a presently recorded predetermined unit of video signal and other predetermined units of the video signal generated before the presently recorded predetermined unit of the video signal, and recording the time-compressed audio signals after the presently recorded predetermined unit of the video signal; and (b) sequentially outputting time compressed audio signals corresponding to the predetermined unit of the video signal while reproducing the predetermined unit of the video signal as a still image.

2. The method of claim 1, wherein a length of a recording interval of the time-compressed audio signals is shorter than a length of the predetermined units in the step (a).

3. The method of claim 1, wherein the time-compressed audio signals are reproduced in real time in the step (b).

4. A time-lapse recording system for intermittently recording a plurality of predetermined units of a video signal, the system comprising:
- a buffer memory for time-compressing a plurality of audio signals corresponding to N of the predetermined units of the video signal, wherein N is a whole number;
- a multiplexer for multiplexing the predetermined units of video signal and the time-compressed audio signals, wherein said multiplexer sequentially outputs N of the predetermined units of the video signal and then the time-compressed audio signals which correspond to the previously output N predetermined units of the video signal;
- a recording amplifier for transmitting at least one of the N predetermined units of the video signal corresponding to the time-compressed audio signals transmitted by the multiplexer, and the time-compressed audio signals which correspond to the N predetermined units of the video signal;
- a recording unit for recording the at least one of the N predetermined units of the video signal and the time-compressed audio signals transmitted by the recording amplifier; and
- a system controlling unit for controlling operation of the buffer memory, the multiplexer, the recording amplifier, and the recording unit.

5. The system of claim 4, wherein the buffer memory comprises a first memory and a second memory for alternately recording the audio signals corresponding to the N predetermined units of the video signal at during alternate recording cycles to produce the time-compressed audio signals corresponding to the N predetermined units of the video signal.

6. The system of claim 4, wherein N is set in accordance with a selectively determined capacity of the buffer memory, and the buffer memory stores the audio signals corresponding to N of the predetermined units of the video signal and time-compresses the stored audio signals by outputting the audio signals in a compressed time period when the buffer memory reaches the selectively determined capacity.

7. A time-lapse reproducing system for reproducing from a recording medium a plurality of first predetermined units of a video signal and a plurality of second predetermined units of time-compressed audio signals each corresponding to a previously recorded one of the first predetermined units of the video signal, wherein said second predetermined units of time-compressed audio signals are recorded between the first predetermined units of the video signal, the system comprising:
- a demultiplexer for separating and outputting the first predetermined units of the video signal and the corresponding second predetermined units of the time-compressed audio signals, when a signal reproduced from the medium is applied to the demultiplexer;
- a buffer memory for storing the second predetermined units of the time-compressed audio signals output from the demultiplexer to output the time-compressed audio signals in real time while outputting the corresponding first predetermined units of the video signal; and
- a system controlling unit for controlling operations of the demulitplexer and the buffer memory.

8. The system of claim 7, wherein the buffer memory comprises a first memory and a second memory for alternately storing time-compressed audio signals corresponding to the first predetermined units of the video signal at each reproducing cycle and outputting the stored audio signals in real time while the first predetermined units of the video signal are reproduced as still images.

9. A time-lapse recording and reproducing method for intermittently recording and reproducing a plurality of predetermined units of a video signal, the method comprising the steps of:
(a) alternately recording at least an Nth one of the predetermined units of the video signal and a plurality of time-compressed audio signals corresponding to the Nth one of the predetermined units of the video signal and N-1 of the predetermined units of the video signal generated before the Nth one of the predetermined units of the video signal, wherein N is a whole number; and
(b) sequentially reproducing the time compressed audio signals corresponding to the Nth one of the predetermined units of the video signal and the N-1 predetermined units of the video signal while reproducing the Nth one of the predetermined units of the video signal as a still image.

* * * * *